United States Patent
Gangeh et al.

(10) Patent No.: US 11,763,581 B1
(45) Date of Patent: Sep. 19, 2023

(54) METHODS AND APPARATUS FOR END-TO-END DOCUMENT IMAGE QUALITY ASSESSMENT USING MACHINE LEARNING WITHOUT HAVING GROUND TRUTH FOR CHARACTERS

(71) Applicant: EYGS LLP, London (GB)

(72) Inventors: Mehrdad Jabbarzadeh Gangeh, Mountain View, CA (US); Hamid Reza Motahari Nezad, Los Altos, CA (US)

(73) Assignee: EYGS LLP, London (GB)

( * ) Notice: Subject to any disclaimer, the term of this patent is extended or adjusted under 35 U.S.C. 154(b) by 0 days.

(21) Appl. No.: 17/967,311

(22) Filed: Oct. 17, 2022

(51) Int. Cl.
*G06F 40/40* (2020.01)
*G06V 30/12* (2022.01)
*G06V 30/19* (2022.01)

(52) U.S. Cl.
CPC ............ *G06V 30/133* (2022.01); *G06F 40/40* (2020.01); *G06V 30/19147* (2022.01)

(58) Field of Classification Search
CPC . G06V 30/133; G06V 30/19147; G06F 40/40
USPC ........................................................ 382/181
See application file for complete search history.

(56) References Cited

U.S. PATENT DOCUMENTS

| 2017/0104993 | A1* | 4/2017 | Jeong | H04N 19/154 |
| 2019/0341150 | A1* | 11/2019 | Mostofi | G06N 3/04 |
| 2020/0381096 | A1* | 12/2020 | Zaharchuk | G06F 18/24323 |
| 2023/0075063 | A1* | 3/2023 | Aladahalli | A61B 8/4254 |

OTHER PUBLICATIONS

Kang, L. et al., "A deep learning approach to document image quality assessment," IEEE International Conference on Image Processing (ICIP), 2014, pp. 2570-2574.
Li, H. et al., "Towards Document Image Quality Assessment: A Text Line Based Framework and A Synthetic Text Line Image Dataset," IEEE 15th International Conference on Document Analysis and Recognition (ICDAR), Sep. 20, 2019, pp. 551-558.

* cited by examiner

*Primary Examiner* — Charlotte M Baker
(74) *Attorney, Agent, or Firm* — COOLEY LLP

(57) ABSTRACT

Methods and apparatus for end-to-end document image quality assessment without having ground truth for characters. An image quality assessment device integrates end-to-end machine learning without using ground truth to automatically predict an overall quality scores for images of documents. The image quality assessment device augments the size of individual image patches extracted from the images based on the contents and size of the images to maintain sufficient size of training data without compromising the reliability of the predicted scores for the images.

21 Claims, 5 Drawing Sheets

METHODS AND APPARATUS FOR END-TO-END DOCUMENT IMAGE QUALITY ASSESSMENT USING MACHINE LEARNING WITHOUT HAVING GROUND TRUTH FOR CHARACTERS

FIELD

The present disclosure generally relates to the field of machine learning for image processing. In particular, the present disclosure is directed to methods and apparatus for end-to-end document image quality assessment without having ground truth for characters.

BACKGROUND

Millions of pages in documents are used in the regular course of business exchanges. A large percentage of documents, such as contracts, invoices, and tax forms, are scanned documents containing various types of noise, including for example salt & pepper noise, blurred or faded text, watermarks, or the like. Noise in scanned documents highly degrade the performance of optical character recognition (OCR) software and/or successive digitization and analysis of scanned documents. Manual inspection of scanned documents for quality is time consuming and laborious. Current document image quality assessment (DIQA) techniques are based on some predefined operators agnostic to all noise types or involve manually labeled characters to estimate target scores for OCR software.

SUMMARY

In one or more embodiments, an apparatus includes a processor and a memory operatively coupled to the processor. The memory stores instructions to cause the processor to receive document image data and a natural language control source that includes unlabeled data. The memory stores instructions to cause the processor to then extract a plurality of image patches of an image patch matrix of a document image formed by the document image data. The memory stores instructions to cause the processor to process the plurality of image patches based on a patch filter window, to calculate a quality target score of a plurality of quality target scores for each image patch of a plurality of image patches based on the natural language control source. The memory stores instructions to further cause the processor to train a quality assessment machine learning model based on at least one of the plurality of image patches or the plurality of quality target scores, to produce a trained quality assessment machine learning model.

In one or more embodiments, an apparatus includes a processor and a memory operatively coupled to the processor, where the memory stores instructions for the processor. The memory stores instructions to cause the processor to receive document image data and extract a plurality of image patches of an image patch matrix of a document image formed by the document image data, to generate an aggregate image patch matrix of a plurality of aggregate image patch matrices. The memory stores instructions to cause the processor to then execute a trained quality assessment machine learning model using the plurality of aggregate image patch matrices as an input, to produce a quality target score of a plurality of quality target scores for each image patch from the plurality of image patches. The memory stores instructions to then cause the processor to generate a qualitative value score for the document image data based on the plurality of quality target scores and generate a labeled control source including natural language readable data of the plurality of image patches based on the qualitative value score.

In one or more embodiments, a method, includes receiving first document image data and a natural language control source. The method further includes extracting a first plurality of image patches of an image patch matrix of a first document image formed by the first document image data and processing the first plurality of image patches based on a patch filter window, to calculate a quality target score from a plurality of quality target scores for each image patch of the first plurality of image patches based on the natural language control source. The method further includes training a quality assessment machine learning model based on at least one of the plurality of image patches or the plurality of quality target scores, to produce a trained quality assessment machine learning model. The method further includes receiving second document image data and extracting a second plurality of image patches of an image patch matrix of a second document image formed by the second document image data, to generate an aggregate image patch matrix from a plurality of aggregate image patch matrices. The method then includes executing the trained quality assessment machine learning model using the plurality of aggregate image patch matrices as an input, to produce a quality target score from a plurality of quality target scores for each image patch from the second plurality of image patches. The method further includes generating a qualitative value score for the second document image data based on the plurality of quality target scores.

DETAILED DESCRIPTION

Figure 1:
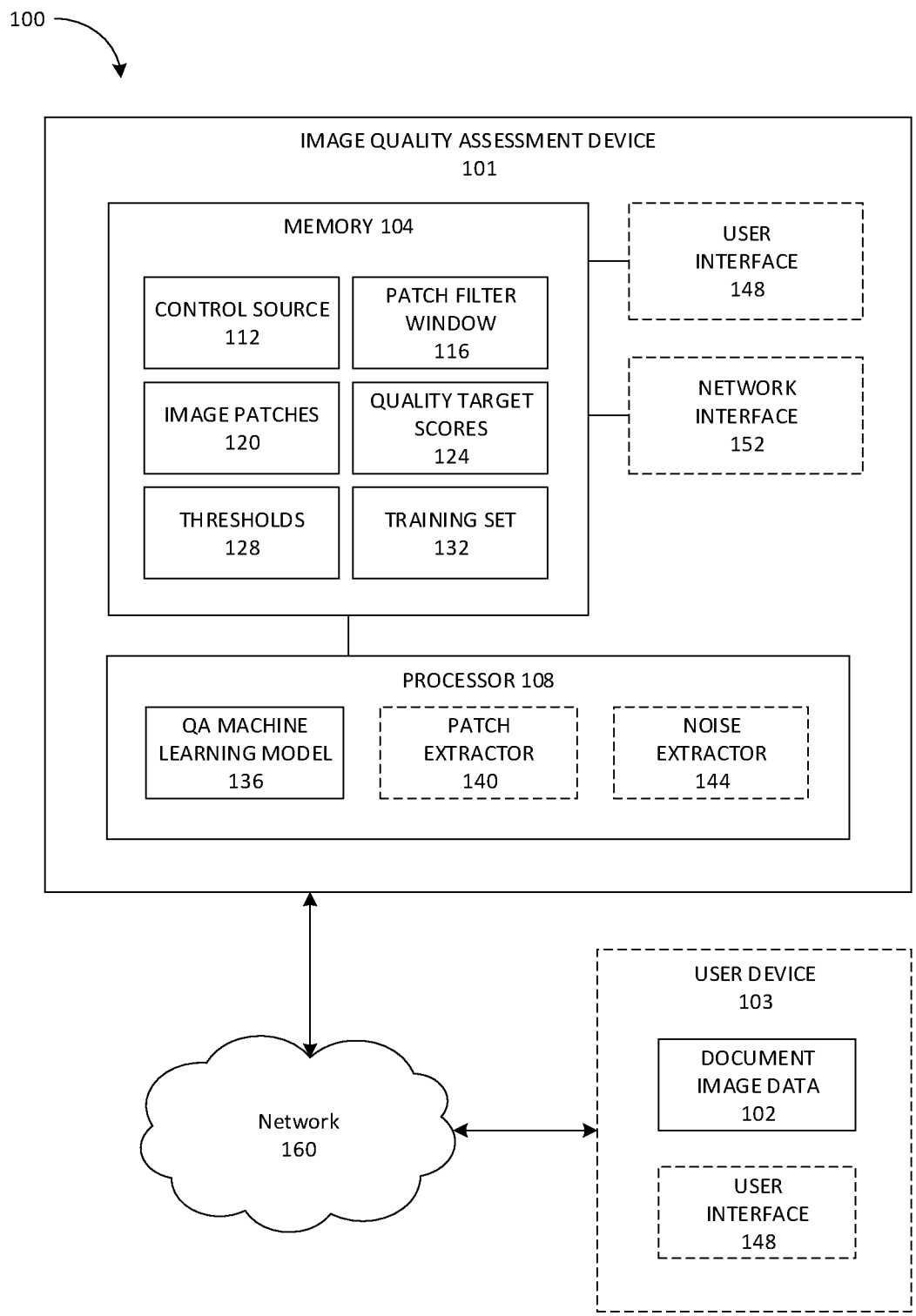
FIG. 1 is a block diagram a system of an end-to-end document image quality assessment device without having ground truth for characters, according to an embodiment.

The end-to-end document image quality assessment device (also referred to as "image quality assessment device") incorporates a deep learning approach that automatically assigns quality score values to images of documents that are noisy or clean. A "noisy" image, as used in this disclosure, can refer to a scanned document or an image of a document that is corrupted (or degraded) with various noises, such as, for example, salt & pepper (S&P) noise, blurry or faded text, watermarks, or the like thereof. Given an image (corrupted with noise or not), the image quality assessment device can estimate a qualitative value score of the image by aggregating multiple quality target scores for multiple image patches of the image and comparing natural language readable data, such as characters, words, and/or text, in each patch with a control source, such as a dictionary, in an automated fashion. The image quality assessment device can determine the quality of an image without ground truth labels for every single natural language readable data in the image. The image quality assessment device can include and/or operate an end-to-end network, such as, for example, convolutional neural network (CNN). The image quality assessment device can generate and/or automate qualitative value scores of millions of images, enabling the training of a machine learning model of the image quality assessment device for quality assessment of images, without manually labeling target quality scores or requiring pre-existing target scores.

In one or more embodiments of the present disclosure, the image quality assessment device can preprocess the image with local normalization and crop the image into multiple image patches, where the size of the image patches can be augmented in size based on the density, size, and number of words found in the image. The image quality assessment device submits the image patches into a three-dimensional (3D) convolutional neural network (CNN), via a patch filter window, to generate the quality target score for each image patch, which are aggregated and/or averaged to assign the qualitative value score for the image. The image quality assessment device can evaluate the patch filter window across the image to select the image patches within the dimensions of the patch filter window to be scored individually or in groups, based on the size of the patch filter window and/or the size of the image patches. In some cases, decreasing the size of the image patch can proportionally make the natural language readable data in the image patch appear larger and overlap with neighboring image patches. Image patches with less natural language readable data and where portions of the natural language readable data are not within the dimension of individual image patches can compromise the accuracy and/or reliability of quality of target scores of each image patch. In some implementations, the natural language readable data can be spread across multiple image patches, where words, based on a vocabulary of the dictionary, can overlap multiple neighboring image patches. The image quality assessment device can evaluate the patch filter window across multiple image patches associated with a first location on the image and a second location on the image where the second location overlaps over some image patches from the first location. The image quality assessment device can detect complete natural language readable data based on the overlaps and automatically update neighboring image patches based on the overlap between the portions covered by the patch filter window. As such, the image quality assessment device can decrease the size of the image patches without compromising the accuracy and/or reliability of the target quality of score of each patch.

In one or more embodiments, the image quality assessment device can train the 3D CNN with a training set including image patches correlated to quality target scores. In some cases, the training set can include multiple clusters of image patches correlated to cluster scores. In developing the training set for the 3D CNN, the image quality assessment device can reduce the size of image patches, thus increasing the size of the training set. The image quality assessment device can also increase the size of image patches to calculate more accurate and/or reliable target scores for the image patches for the training set. For instance, smaller image patches increase the size of the training set but can compromise the reliability of the quality target score because each smaller image patch would include less natural language readable data. Likewise, larger image patches include more natural language readable data, resulting in more accurate and/or reliable quality target scores but reduce the size of the training set. The image quality assessment device can adjust the size of the image patches based on a natural language threshold that includes, for example, a minimum of ten words for an image patch to include. For instance, the image quality assessment device can extract natural language readable data from the image patches, where if the number of natural language readable data detected is below the minimum defined by the natural language threshold (e.g., ten words), the image quality assessment device can increase the size of the image patches, thereby reducing the total number of image patches, so that each image patch contains sufficient natural language readable data for training the machine learning model of the image quality assessment device and/or for developing a training set. In some instances, the image quality assessment device can also reduce the size of the image patches if the dimensions of the image patch matrix result in a fewer total number of image patches that is below a training set threshold. The training set can have a size limit for image patches where if the number of image patches for an input image is too small, the image quality assessment device can reduce the size of the image patches, thereby increasing the total number of image patches.

In one or more embodiments, the image quality assessment device can calculate the qualitative value scores for images, where noisy images are given lower qualitative value scores and clean images are given higher qualitative value scores. The image quality assessment device can be useful, for example, for any document digitization product including, automated analysis of noisy documents, information extraction from noisy documents, document image enhancement, and/or the like.

FIG. 1 is a block diagram for a system 101 of an end-to-end document image quality assessment device 101 without having ground truth for characters, according to an embodiment. The system 101 includes the image quality assessment device 101, which can include (or be) any compute device. The image quality assessment device 101 includes a memory 104 and a processor 108 operatively coupled to the memory 104. In some implementations, the image quality assessment device 101 can also optionally include a network interface 152 and/or a user interface 148. The processor 108 and a memory 104 can communicate with each other, and with other components, via a bus (not shown). The bus can include any of several types of bus structures including, but not limited to, a memory bus, a memory controller, a peripheral bus, a local bus, and/or any combinations thereof, using any of a variety of bus architectures. The image quality assessment device 101 can include (or be), for example, a computer workstation, a terminal computer, a server computer, a handheld device (e.g., a tablet computer, a smartphone, etc.), any machine capable of executing a sequence of instructions that specify an action to be taken by that machine, and any combinations thereof. The image qualitative assessment device 101 can alternatively include multiple compute devices that can be used to implement a specially configured set of instructions for causing one or more of the compute devices to perform any one or more of the aspects and/or methodologies of the present disclosure.

The system 100 can optionally include a user device 103 operated by user to transmit an input such as document image data 102 to the image quality assessment device 101. In some implementations, the user device 103 can optionally include a user interface 148, where the user can transmit user inputs via the user interface 148 of the user device 103 to transmit/receive signals and/or communicate with the image quality assessment device 101. The image quality assessment device 101 can receive the document image data 102 via a connection with a network 160, through which the image quality assessment device 101 and the user device 103, and/or any other user devices, can communicate. The user device 103 can include (or be) any compute device. The user device 103 can include (or be) a remote device (e.g., at a location remote from the location of image quality assessment device 101). The image quality assessment device 101 can receive, via multiple user devices, multiple document image data via the connection with the network 160. The user device 103 can also receive any outputs from the image quality assessment device 101, such as, for example, a qualitative value score of the document image data 102.

The image qualitative assessment device 101 can optionally include the network interface 152. The network interface 152, can be used for connecting the image qualitative assessment device 101 to one or more of a variety of networks (e.g. the network 160) and one or more remote devices (e.g. the user device 103) connected thereto. In some implementations, the network interface 152 can include, for example, a network interface card (e.g., a mobile network interface card, a LAN card), a modem, and/or any combination thereof. The image quality assessment device 101 can connect to the network 160 via the network interface 152, where the network can include, for example, a wide area network (e.g., the Internet, an enterprise network), a local area network (e.g., a network associated with an office, a building, a campus or other relatively small geographic space), a data network, a direct connection between two computing devices, and/or the like. The image qualitative assessment device 101 can employ a wired and/or a wireless mode of communication.

In some implementations, the image quality assessment device 101 can include the user interface 148 with which the user can interact. The user interface 148 can include a device such as, for example, a graphical user interface (GUI), a monitor, and/or the like, that receives user inputs, such as, for example, the document image data 102, from the user to interact with the image quality assessment device 101 and/or receive outputs such as, for example, the qualitative value score of the document image data 102. The user interface 148 can include, for example, a touch screen, a trackpad, buttons, keyboard, switches, and/or the like. A user can interact with the image quality assessment device 101 via the user interface 148, where the user can provide document image data 102 as an input for the image quality assessment device 101 to determine a qualitative value score for the document image data 102.

The processor 108 can be or include, for example, a hardware based integrated circuit (IC), or any other suitable processing device configured to run and/or execute a set of instructions or code. For example, the processor 108 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 108 can be configured to run any of the methods and/or portions of methods discussed herein. The processor 108 can connect to other remote compute devices via a network and/or server (not shown). The image quality assessment device 101 can receive the document image data 102 from the remote devices and be stored in the memory 108.

The processor 108 of the image quality assessment device 101 can include a quality assessment machine learning model 136. The quality assessment machine learning model 136 can include (or be) a supervised or an unsupervised machine learning model. In some implementations, the quality assessment machine learning model 136 can include (or be) an end-to-end machine learning model. The quality assessment machine learning model 136 can also include (or be) any neural network such as, for example, a 3D convolutional neural network (CNN) or a CNN that uses temporal pooling. In some implementations, the quality assessment machine learning model 136 can include (or be) a deep learning network. In some implementations, the image quality assessment device 101 can include (or be) an end-to-end network for the machine learning model 136. In some implementations, the image quality assessment device 101 can operate the end-to-end network including a neural network (e.g., CNN).

The quality assessment machine learning model 136 can receive multiple image patches 120 extracted from the document image data 102 and/or a control source 112 as inputs. In some implementations, the quality assessment machine learning model 136 does not rely on ground truth to evaluate the accuracy of the quality assessment machine learning model and instead computes quality target scores 124 for multiple image patches 120, where the quality target scores 124 can be based on the number of correct natural language readable data, compared with natural language readable data in the control source 112, identified in the image patches 120. In some cases, the quality target scores 124 can be based on the correctness of the natural language identified in the image patches 120. The control source 112 and the image patches 120 can be used as an input for training the quality assessment machine learning model 136.

The image quality assessment device 101 can also include an optional patch extractor 140. The patch extractor 140 can include any hardware/software module used to extract pixels that form image patches 120, which can be stored in the memory 104. In some implementations, the patch extractor 140 can include a sensor (not shown) to capture the multiple image patches 120 from an input such as the document image data 102. In some cases, the sensor can include an automated text extractor. In some cases, the sensor can include a charge coupled device (CCD) sensor, a complementary metal-oxide semiconductor (CMOS) sensor, a contact image sensor (CIS) or the like. The sensor can include multiple sensors, cameras, or the like. In some implementations, the image quality assessment device 101 can receive a document image formed by the document image data 102, where the document image is for example a digital version, copy, and/or scanned version of a physical document. The document image formed by the document image data 102 can include (or be) for example an image of a document containing multiple pages, a scanned document and/or image, or the like. In some implementations, the patch extractor 140 can generate and/or use an image patch matrix (not shown) that is based on the input (e.g., the document image data 102) and that outlines multiple image patches 120. The patch extractor 140 can also configure the dimension of the image patch matrix and the image patches 120. The patch extractor 140 can also image patches 120 of the document image data 102 that contain natural language readable data, such as, for example, characters, words, numbers, and/or text. In some implementations, the patch extractor 140 can also identify image patches 120 of the document image data 102 containing no natural language readable data and exclude them from being processed and/or given qualitative target scores 124 to reduce computational overhead.

The processor 108 of the image quality assessment device 101 can also optionally include a noise extractor 144. The noise extractor 144 can include any hardware/software module that extracts various features of the input (e.g., the image and/or document). The features can include noise such as, for example, S&P noise, blurry or faded text, watermarks, pictures, or the like. In some implementations, the noise extractor 144 can also determine image patches 120 that contain either noises or natural language readable data or image patches 120 containing both. In some implementations, the noise extractor 144 can process the image patches 120 and transform the image patches 120 into a feature vector that includes numerical values describing objects found in the image patches 120, where the feature vector describes noise and/or natural language readable data found in the image patches 120. In some implementations, the noise extractor 144 can include a machine learning model and/or a CNN to identify, via the feature vector, image patches 120 that contain noise and/or natural language readable data. In some implementations, the noise extractor 144 can select the image patches 120 extracted from the patch extractor 140 that contain objects representing noise and/or any other feature found in the image patches.

The memory 104 can be or include, for example, a random-access memory (RAM), a memory buffer, a hard drive, a read-only memory (ROM), an erasable programmable read-only memory (EPROM), and/or the like. In some instances, the memory 104 can store, for example, one or more software programs and/or code that can include instructions to cause the processor 108 to perform one or more processes, functions, and/or the like. In some implementations, the memory 104 can include extendable storage units that can be added and used incrementally. In some implementations, the memory 104 can be a portable memory (e.g., a flash drive, a portable hard disk, and/or the like) that can be operatively coupled to the processor 108. The memory 104 can include various components (e.g., machine-readable media) including, for example, a random-access memory component, a read only component, and/or any combinations thereof. In one example, a basic input/output system (BIOS), including basic routines that help to transfer information between components within the image quality assessment device 101, such as during start-up, can be stored in memory 104. The memory 104 can further include any number of program modules including, for example, an operating system, one or more application programs, other program modules, program data, and/or any combinations thereof.

The memory 104 of the image quality assessment device 101 includes a control source 112, a patch filter window 116, image patches 120, quality target scores 124, thresholds 128, and a training set 132. The document image data 102 can be inputs for the patch extractor 140, and/or the noise extractor 144. The image patches 120 can be inputs for the quality assessment machine learning model 136 and/or the noise extractor 144. The document image data 102 including the document image can be, for example, a lease document, tax forms, contracts, invoices, or the like. The document image data 102, as a result of digitizing and/or scanning the document, can contain various noise type, such as S&P noise, blurry or faded text, watermarks, stamps, and/or the like. The control source 112, also referred to as a "natural language control source," can include a dictionary, a vocabulary of a dictionary, a dictionary containing correct natural language readable data, or the like. In some implementations, the language of the natural language readable data in the document image data 102 can be identical and/or similar to the language of the control source 112. The control source 112 can be used to compare the number of correct natural language readable data identified in the image patches 120, where correctness is based on the quality target scores 124 for the image patches 120. The control source 112 can include unlabeled data, where the natural language readable data from the control source 112 are not correlated with the natural language readable data in the image patches 120 of the document image data 102.

The patch filter window 116 can include for example a two-dimensional (2D) filter, window, and/or frame that selects image patches 120 to be used as inputs for the quality assessment machine learning model 136. The patch filter window 116 and the image patches 120 outlined by the patch filter window 116 are described in further detail below with respect to FIG. 4A or FIG. 4B. In some implementations, to generate the quality target score for each image patch, which can be aggregated and/or averaged to assign the qualitative value score for the image, the image quality assessment device 110 can evaluate the patch filter window 116 across the document image data 102 to select the image patches 120 within the dimensions of the patch filter window 116 to be scored individually or in subsets, based on the size of the patch filter window 116 and/or the size of the image patches 120. In some cases, reducing the size of each image patch can proportionally make the natural language readable data in each image patch appear larger and overlap with neighboring image patches. The neighboring image patches can include (or be) adjacent image patches of the image patches that are completely within the borders of the patch filter window 116. Image patches 120 with less natural language readable data and where portions of the natural language readable data are not within the dimension of each image patch can compromise the accuracy and/or reliability of quality target scores 124 of the image patches 120. In some implementations, the natural language readable data can be spread across multiple image patches 120, where natural language readable data can overlap multiple neighboring image patches. The image quality assessment device 110 can evaluate the patch filter window 116 across the entirety of the document image data 102 outlined by the image patch matrix at a first location on the image and a second location on the document image data 102 where the second location overlaps some image patches 120 from the first location. The image quality assessment device 101 can detect complete characters and/or words from the natural language readable data based on the overlaps and automatically update neighboring image patches based on the overlap between the portions covered by the patch filter window 116. For example, the patch filter window 116 can have a 4×4 dimension, where a total of 16 image patches 120 can be covered by the patch filter window 116.

In some implementations, the patch filter window 116 can act as a pooling layer to reduce the spatial volume and/or dimension of the document image data 102 via the image patch matrix. For instance, the image quality assessment device 101 can perform a pooling operation (e.g., max pooling) that selects image frames from a region covered and/or outlined by the patch filter window 116. For example, the patch filter window 116 can include (or be) a 4×4 dimension filter/window, where the patch extractor 140 and/or the noise extractor 144 can select the image patches 120 within the patch filter window 116 that contain natural language readable data and/or noise to be used as inputs for the quality assessment machine learning model 136 and assigned qualitative value scores 124 for each image patch. In some implementations, the patch filter window 116 can be used to down-sample the document image data 102 for the generating of reliable quality target scores 124 to generate and/or populate the training set 132 with reliable quality target scores 124 and enough samples for training the quality assessment machine learning model 136.

In some implementations, the quality assessment machine learning model 136 can be trained using inputs such as subsets of image patches 120 of the document image data 102, including, for example, an aggregate image patch matrix (not shown) from a plurality of aggregate image patch matrices, where the aggregate image patch match matrix is generated from extracted image patches 120 based on the image patch matrix and the image patches 120, including neighboring image patches, outlined by the patch filter window 116 of the document image formed by the document image data 102.

The thresholds 128 can include a character threshold and/or a noise score threshold. The character threshold can include a minimum and/or maximum value and/or number of natural language readable data, such as characters, for an image patch of the multiple image patches 120. In some cases, if the image patch contains less than 10 natural language readable data, i.e., the image patch contains natural language readable data that does not meet the minimum represented by the character threshold, the image patch matrix is augmented to reduce the total number of image patches 120 and increase the size of each image patch to contain more natural language readable data that exceed the minimum represented by the character threshold. Similarly, if the number of natural language readable data exceed the maximum represented by the character threshold, the image patch matrix can be augmented to increase the total number of image patches 120 and reduce the size of each image patch. In some implementations, the character threshold can be set to fit a desired characteristic(s) for the training set 132 such that the training set 132 is not compromised by limited size of the training set as a result of the augmented image patch matrix. The noise score threshold can include a minimum and/or maximum value and/or number for the qualitative value score for the document image data 102 that indicates if the document image data 102 is clean or noisy/corrupted enough to benefit from (meaningfully improved by) denoising. Denoising of the document image data 102 can include removing, to at least an extent, the noise found in the document image data 102. The thresholds 128 can also be augmented and/or modified. In some instances, the image quality assessment device can also reduce the size of the image patches if the dimensions of the image patch matrix result in a fewer total number of image patches that is below a training set threshold. The training set can have a size limit for image patches where if the number of image patches for an input image is too small, the image quality assessment device can reduce the size of the image patches, thereby increasing the total number of image patches.

Figure 4A:
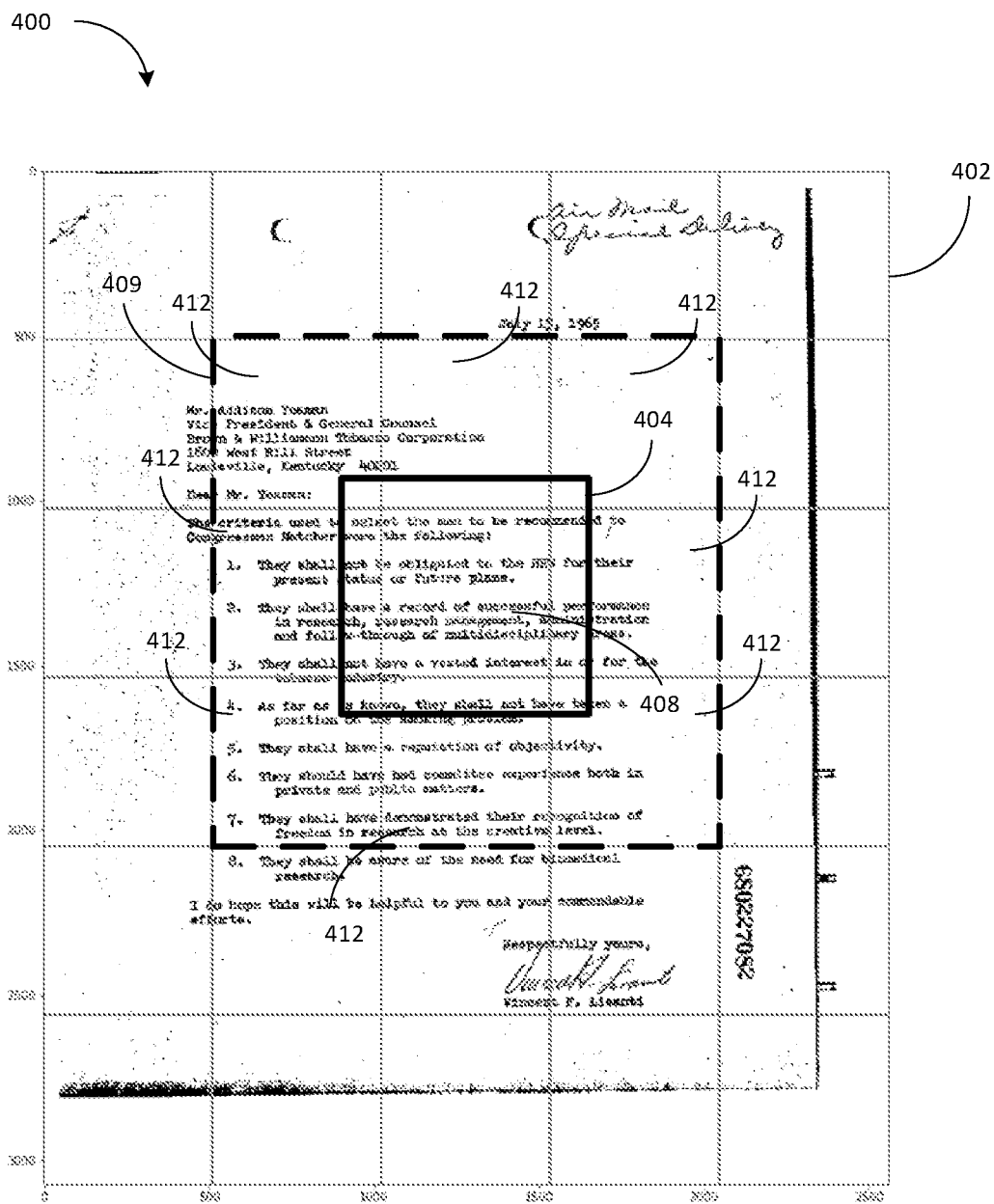
FIG. 4A is a diagrammatic representation of a document image with large image patches and a patch filter window, according to an embodiment.
Figure 4B:
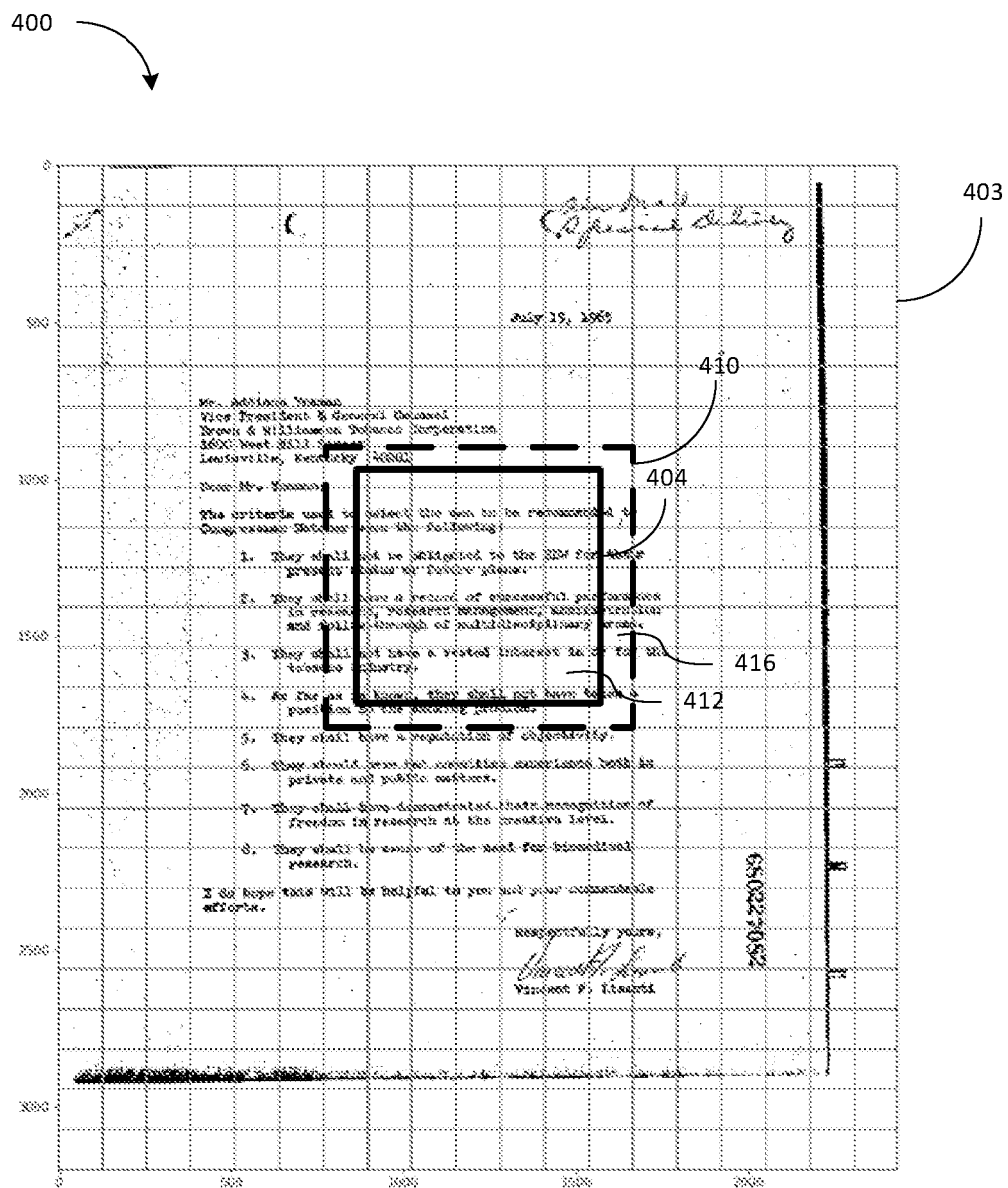
FIG. 4B is a diagrammatic representation of a document image with small image patches and a patch filter window, according to an embodiment.

The image patches 120 can include 2D portions of the document image data 102 based on the image patch matrix. The image patch matrix outlines multiple image patches 120 that are, for example, equally divided portions of the document image data 102. The image patches 120 can include equal sized squares as shown in FIGS. 4A and 4B. The size of the image patches 120 can be increased and/or reduced based on the character threshold and/or via manual input. The image patches 120 can be used as inputs for the quality assessment machine learning model 136.

The quality target scores 124 can include a numerical value and/or score for the image patches 120 of the document image data 102. The quality target scores 124 can include a number of correct natural language readable data the image patches. Each image patch of the multiple image patches can be assigned a quality target score of the multiple quality target scores 124. The quality target scores 124 can be generated by the quality assessment machine learning model 136. The quality target scores 124 can be updated continuously, non-continuously, and/or automatically based on natural language readable data that are spread across multiple image patches 120. For instance, a word can be spread across two adjacent and/or neighboring image patches 120. The quality assessment machine learning model 136 can generate a lower score based on an incomplete word found in a first image patch, where the word in the first image patch includes only the first half of the characters comprising the word. A second image patch can contain the remaining half of the word where the quality assessment machine learning model 136 can also generate a lower score because of the incomplete word. The quality assessment machine learning model 136 can compare the first image patch and the second image patch and determine that the word is correct and/or accurate and update the lower scores of both the first image patch and the second image patch to reflect the correctness of the word.

The training set 132 can be used to train the quality assessment machine learning model 136. In some implementations, the training set 132 can include the image patches 120 and/or the natural language readable data in the image patches correlated to the quality target scores 124. The training set 132 can include older image patches and previously generated quality target scores from previously processed document image data to further train the quality assessment machine learning model 136. In some implementations, the training set 132 can be continuously populated and/or augmented, and can be used as a ground truth for the quality assessment machine learning model 136 in a supervised state. In some implementations, the training set 132 includes readable data correlated to a target score.

Figure 2:
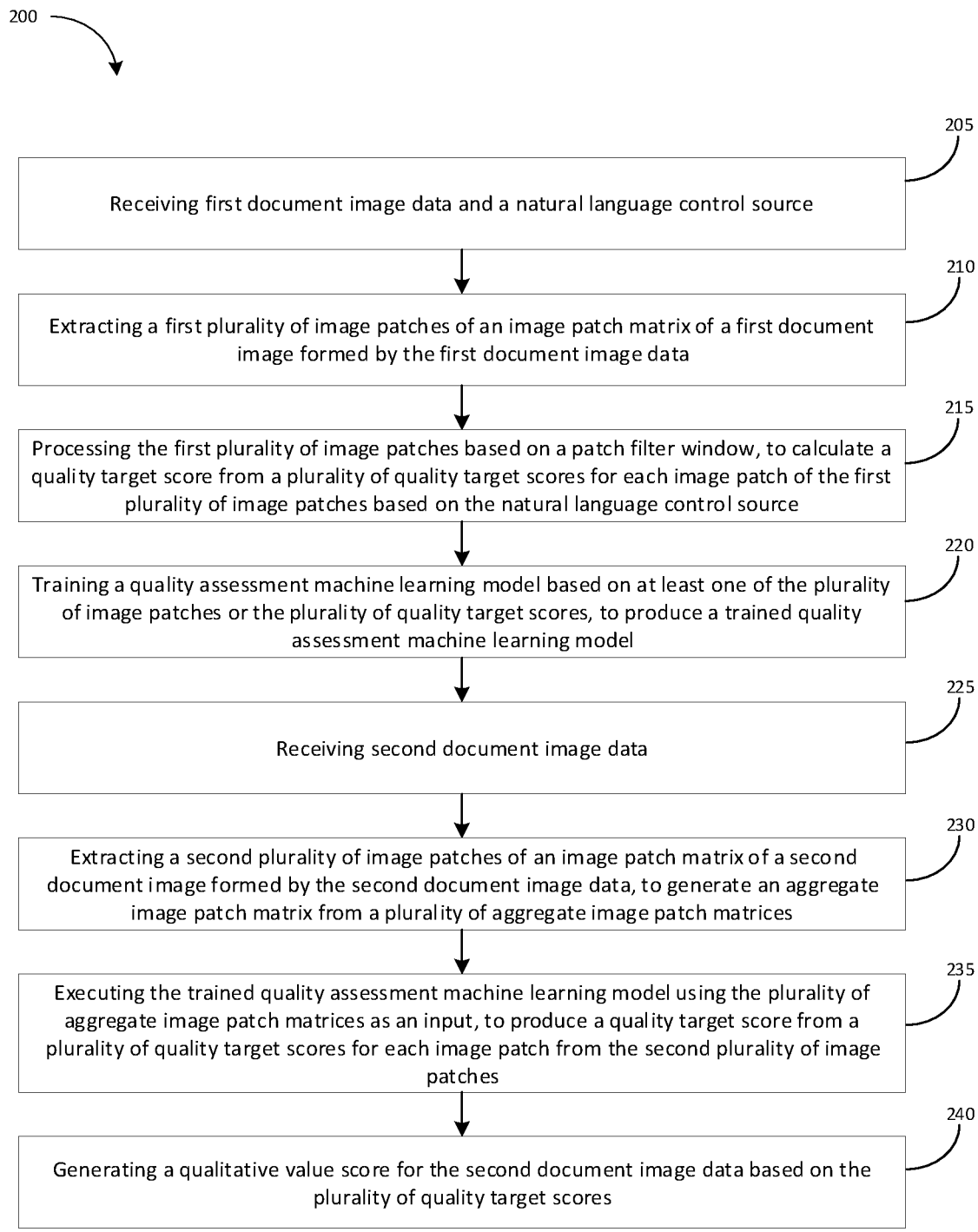
FIG. 2 is flowchart of a method for an end-to-end document image quality assessment device without having ground truth for characters, according to an embodiment.

FIG. 2 is flowchart of a method 200 for an end-to-end document image quality assessment device (such as image quality assessment device 101 of FIG. 1) without having ground truth for characters, according to an embodiment. At 205, the method 200 includes receiving, via a processor of the image quality assessment device operatively coupled to a memory of the image quality assessment device, first document image data and a natural language control source. The first document image data can describe and/or form a first document image. For instance, the first document image data can include any document image data, for example, an image of a physical document and/or a scanned copy of the physical document. The first document image data can include (or be) for example an invoice(s), a lease document(s), a tax form(s), or the like, and contain various noise types, as a result of digitizing and/or scanning the physical document, such as, for example, S&P noise, stamps, blurry or faded text, watermarks, and/or any combination thereof. The control source can include (or be) for example a dictionary, a vocabulary of a dictionary, natural language readable data of a dictionary, characters and/or words of a dictionary, or the like. The natural language control source can be consistent with any control source and can be unlabeled and not correlated with any natural language readable data (e.g., characters or words) found in the first document image data.

At 210, the method 200 includes extracting, via the processor and a patch extractor, a first plurality of image patches of an image patch matrix of a first document image formed by the first document image data. The first plurality of image patches can include any multiple image patches outlined by the image patch matrix, where the first plurality of image patches are equal sized 2D portions comprising the image patch matrix and/or the first document image data. Extracting the first plurality of image patches can include extracting image patches that contain objects including natural language readable data and/or noise and/or ignoring image patches that are blank. The processor and/or the patch extractor can extract the first plurality of image patches automatically.

At 215, the method 200 includes processing the first plurality of image patches based on a patch filter window, to calculate a quality target score from a plurality of quality target scores for each image patch of the first plurality of image patches based on the natural language control source. The patch filter window can include a 2D filter that selects image patches within the patch filter window. The patch filter window outlines the image patches of the first document image data outlined by the image patch matrix, where the image quality assessment device calculates a quality target score for each image patch outlined by the patch filter window. The image quality assessment device 101 of FIG. 1 can evaluate the patch filter window across the entirety of the first document image data, selecting the image patches to be given quality target scores, where one or more image patches can be scored more than once as a result of the evaluation of the patch filter window across the entirety of the first document image data. The quality target score for each image patch of the first plurality of image patches can be updated as a result of an overlap between the image patches scored from a previous iteration of scoring via the patch filter window. In some cases, a subset of image patches included in the patch filter window can be referred to as a subset of image patch matrices. In some implementations, the method 200 can include reducing a size of each image patch from the plurality of image patches, to increase a number of image patches in the patch filter window, prior to processing the plurality of image patches to calculate the quality target score of the plurality of quality target scores. In some implementations, the method 200 can also include adjusting the size of each image patch from the plurality of image patches based on a character threshold, prior to processing the plurality of image patches to calculate the quality target score of the plurality of quality target scores, where the character threshold indicates a minimum count of readable data in each image patch of the plurality of image patches.

Processing the first plurality of image patches can also include processing image patches that are not entirely outlined by the patch filter window. For instance, the dimension of the patch filter window can outline a portion of an image patch of the first plurality of image patches. The image patches that are not entirely outlined and/or covered by the patch filter window can be referred to as "neighboring image patches". These neighboring image patches are also included by the patch filter window and/or processed to also be given qualitative target scores. Calculating the quality target scores can be based on the natural language control source by, for example, comparing the natural language readable data in the image patches of the first plurality of image patches processed via the patch filter window with the natural language control source. The quality target scores for the first plurality of image patches can include a numerical value of the number correct and/or correctly-identified natural language readable data of the first plurality of image patches. In some cases, the quality target scores can be based on the comparison of spelling and/or clarity of the natural language readable data of the first plurality of image patches.

In some implementations, processing the first plurality of image patches can include processing a first aggregate image patch of the first document image data based on a first patch filter window, where the first aggregate image patch includes a first cluster of image patches. The aggregate image patch matrix can refer to a neighborhood of image patches that include both the image patches well within the outline of the patch filter window as well as the neighboring image patches that are partially covered by the outline of the patch filter window. The neighborhood of image patches (e.g., aggregate image patch matrices) can be used as inputs for training and/or testing the quality assessment machine learning model.

The first patch filter window can cover a first location on the image patch matrix of the first document image data. The first cluster of image patches can include (or be) multiple image patches of the first document image data covered by the first patch filter window. The image patches in the first cluster of image patches can include individual image patches that are completely within the first patch filter window. The first aggregate image patch including the first cluster of image patches can also include neighboring image patches of the first plurality of image patches. For instance, the first patch filter window can include and/or have dimensions of 4×4 and cover the upper left corner of the image patch matrix and/or the first document image data. The first aggregate image patch can include (or be) the image patches contained within the 4×4 dimensions, which include 16 total image patches of the first plurality of image patches. The first cluster of image patches can include (or be) the image patches outlined and/or covered by the first patch filter window, which can cover a portion of an adjacent and/or neighboring image patch of the first cluster of image patches. In some cases, the size of the first plurality of image patches can be augmented. Even though only a portion of the image patch is covered by the first plurality of image patches, the first aggregate image patch can include neighboring image patches to also be processed and/or given target quality scores. The method 200 can also include calculating a first cluster of quality target scores for each image patch of the first cluster of image patches. The method 200 can also include calculating target scores for the neighboring image patches of the first aggregate image patch. In some cases, the method 200 can include calculating a weighted average score for the first aggregate image patch and/or the first cluster of image patches.

In some implementations, the method 200 can further includes processing a second aggregate image patch of the first document image data, including a second cluster of image patches, based on a second patch filter window. The second aggregate image patch includes a second cluster of image patches, and at least one image patch from the second cluster of image patches is identical to at least one image patch from the first cluster of image patches. Similarly to the first aggregate patch filter window, the second patch filter window can cover a second location on the image patch matrix of the first document image data different from the first location. In some cases, the first location and the second location can overlap and share one or more image patches of the first plurality of image patches.

The method 200 can also include calculating a second cluster of quality target scores for each image patch from the second cluster of image patches based on the at least one image patch from the first cluster of image patches and the at least one image patch from the second cluster of image patches that are identical to each other. The second cluster of image patches can include (or be) multiple image patches of the first document image data covered by the second patch filter window. The image patches in the second cluster of image patches can include individual image patches that are completely within the second patch filter window. The second aggregate image patch including the second cluster of image patches can also include neighboring image patches of the first plurality of image patches. For instance, the second patch filter window can include and/or have dimensions of 4×4 and cover the upper middle portion of the image patch matrix and/or the first document image data. In some cases, the second cluster of image patches can include (or be) some neighboring image patches of the first aggregate image patch. The method 200 can also include calculating a second cluster of quality target scores for each image patch of the second cluster of image patches. The method 200 can also include calculating target scores for the neighboring image patches of the second aggregate image patch. In some cases, the method 200 can include calculating a weighted average score for the second aggregate image patch and/or the second cluster of image patches.

In some implementations, the method 200 can also include updating the quality target score of one or more overlapping image patches between the first cluster of image patches and the second cluster of image patches, where the overlapping image patches include neighboring image patches of one location and included in a cluster of image patches of another location.

At 220, the method 200 includes training a quality assessment machine learning model based on at least one of the plurality of image patches or the plurality of quality target scores, to produce a trained quality assessment machine learning model. The quality assessment machine learning model can include a 3D CNN and/or a CNN using temporal pooling. The quality assessment machine learning model can include an unsupervised machine learning model and/or a supervised machine learning model. Training the quality assessment machine learning model can include using a training set that includes image patches, such as the first plurality of image patches, correlated to quality target scores. In some cases, the training set can include multiple clusters of image patches correlated to cluster scores. In developing the training set for the 3D CNN, the image quality assessment device can reduce the size of image patches, thus increasing the size of the training set. The image quality assessment device can also increase the size of image patches to calculate more accurate and/or reliable target scores for the image patches for the training set. For instance, smaller image patches increases the size of the training set but can compromise the reliability of the quality target score because the image patch would include less natural language readable data. Likewise, larger image patches include more natural language readable data, resulting in more accurate and/or reliable quality target scores but reduce the size of the training set. For example, reducing the size of the image patch by four results in an increase in the size of the training set by a factor of 16. In some implementations, training the quality assessment machine learning model can include training the quality assessment machine learning model using subsets of image patches included in the patch filter window as inputs. Training the quality assessment machine learning model using the training set can also include training the quality assessment machine learning model without labeling the training set.

In some implementations, prior to training the quality assessment machine learning model, the multiple qualitative target scores used to train the quality assessment model can be calculated in a previous training iteration of the quality assessment model. Alternatively or additionally, the qualitative target scores used to train the quality assessment machine learning model can be calculated from a different machine learning model and/or provided from an external and/or third party source. In some implementations, training the quality assessment machine learning model can include training the quality assessment machine learning model automatically and/or on the fly.

At 225, the method 200 includes receiving second document image data. The second document image can be similar to the first document image data and can contain features including noise and/or natural language readable data. The second document image data can also include (or be) any future document image data received by the image quality assessment device in a continuous and/or iterative process.

At 230, the method 200 includes extracting a second plurality of image patches of an image patch matrix of a second document image formed by the second document image data, to generate an aggregate image patch matrix from a plurality of aggregate image patch matrices. The second document image formed by the second document image data can include an image a digital version and/or copy of a physical document different from the physical document of the first document image data. The second plurality of image patches can be similar in structure to the first plurality of image patches. In some implementations, extracting the second plurality of image patches can be performed by a patch extractor (e.g., patch extractor 140 of FIG. 1). In some implementations, the method of extracting the second plurality of image patches can be identical to the method of extracting the first plurality of image patches. The aggregate image patch matrix can include a subset of image patches of the second document image data outlined by the image patch matrix and the patch filter window used for the first document image data. The aggregate image patch matrix can include image patches of the second document image data, such as, for example, neighboring image patches of the second document image data. In some cases, multiple aggregate image patch matrices can include one or more of the same image patches of the second plurality of image patches. The image patch matrices can form the image patch matrix of the second document image data.

In some implementations, the aggregate image patch matrix can be similar to the first aggregate image patch and/or the second aggregate image patch as described previously. The first aggregate image patch and/or the second aggregate image patch can be used as inputs to train the quality assessment machine learning model. The aggregate image patch matrix of the multiple aggregate patch matrices can be used as an input to test the quality assessment machine learning model.

At 235, the method 200 includes executing the trained quality assessment machine learning model using the plurality of aggregate image patch matrices as an input, to produce a quality target score from a plurality of quality target scores for each image patch from the second plurality of image patches. Producing the quality target scores for the second plurality of image patches of the second document image data can be similar to the calculating of the quality target score from the plurality of quality target scores for each image patch of the first plurality of image patches. The quality target score for each image patch of the second plurality of image patches can be updated as a result of an overlap between the image patches scored from a previous iteration of scoring. In some implementations, the trained quality assessment machine learning model can receive the aggregate image patch matrices as inputs.

At 240, the method includes generating a qualitative value score for the second document image data based on the plurality of quality target scores. In some implementations, the qualitative value score can include an average of the quality target scores of the second plurality of image patches and/or the aggregate patch matrices. In some implementations, the method 200 can also include determining if the second document image data is dirty or clean and/or would meaningfully benefit from denoising. The method 200 can also be performed automatically.

Figure 3:
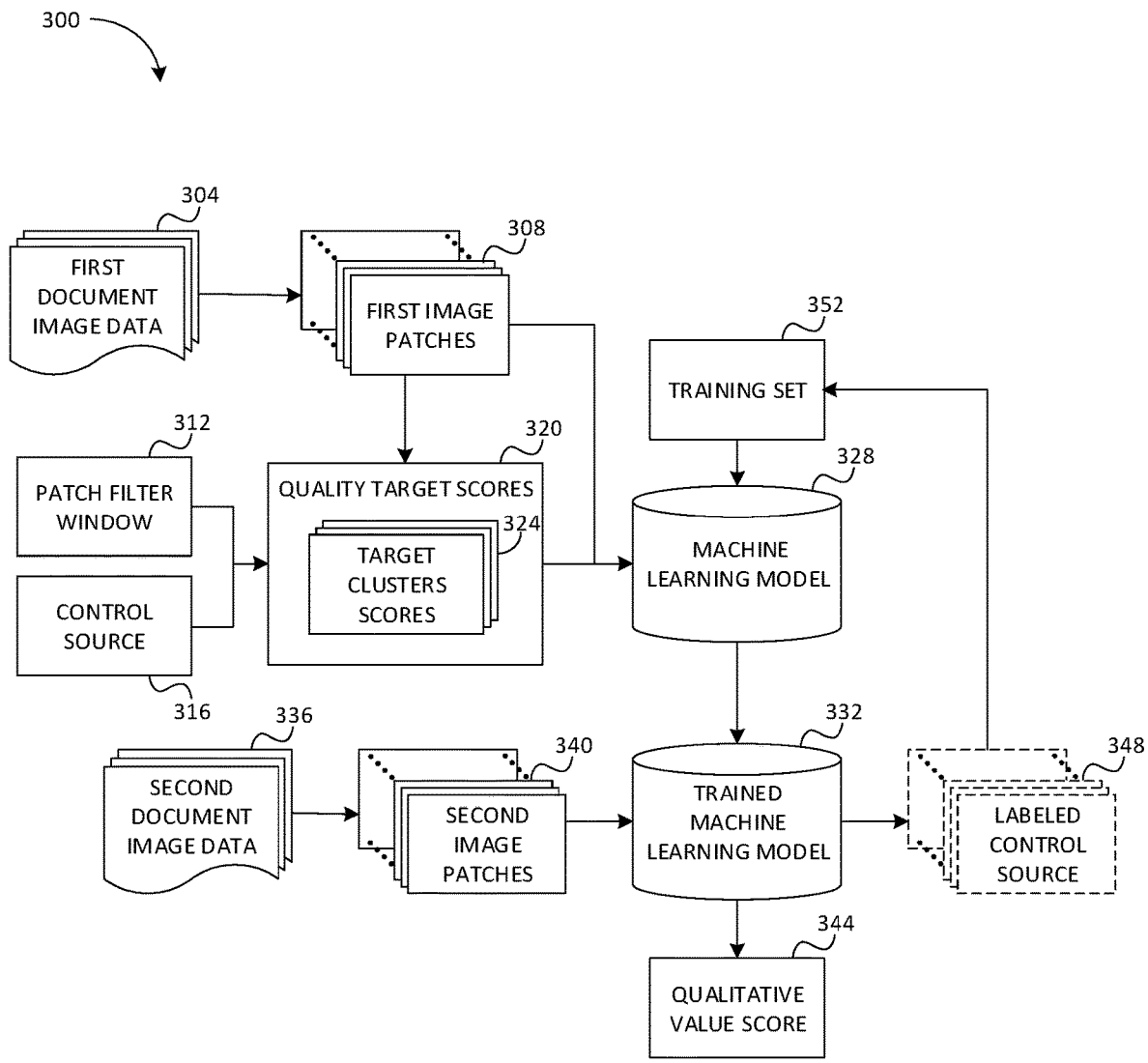
FIG. 3 is a flowchart of a process for end-to-end document image quality assessment device without having ground truth for characters, according to an embodiment.

FIG. 3 is a flowchart of a process 300 for an end-to-end document image quality assessment device (same as or similar to image quality assessment device 101 of FIG. 1) without having ground truth for characters, according to an embodiment. The process 300 can be divided into a training process and a testing process for the quality assessment machine learning model 328. For the training process of the quality assessment machine learning model 328, the memory of the image quality assessment device stores instructions to cause the processor of the image quality assessment device to receive a first document image data 304. The first document image data 304 includes any document image data described in the entirety of this disclosure.

Continuing with the training process of the quality assessment machine learning model 328, the memory of the image quality assessment device stores instructions to cause the processor to extract a first plurality of image patches 308 of an image patch matrix of a document image formed by the first document image data 304. The first plurality of image patches 308 can be for example consistent with any image patches described in the entirety of this disclosure. In some implementations, the processor can extract the first plurality of image patches 308 for example via a patch extractor as described in FIG. 1. Extracting the first plurality of image patches 308 can also include extracting image patches with features such as noise and/or excluding image patches without noise via a noise extractor.

Continuing with the training process of the quality assessment machine learning model 328, the memory of the image quality assessment device stores instructions to cause the processor to also receive a natural language control source 316 that includes unlabeled data. The natural language control source 316 includes natural language readable data that are not correlated with natural language readable data in the any document image data. The processor can further be caused (e.g., by the instructions stored in the memory) to process the first plurality of image patches 308 based on a patch filter window 312, to calculate a quality target score of a plurality of quality target scores 320 for each image patch from the first plurality of image patches 308 based on the natural language control source 316. The memory of the image quality assessment device also stores instructions to further cause the processor to generate multiple target clusters scores 324 of the first document image data 304. The target clusters scores 324 can include any scores for a plurality of clusters of image patches of any document image data.

In some implementations, the memory of the image quality assessment device stores instructions to cause the processor to process a first aggregate image patch (not shown in FIG. 3) from the first document image data 304 and/or the first plurality of image patches 308 based on a first patch filter window, where the first aggregate image patch includes a first cluster of image patches from the first plurality of image patches 308. The first patch filter window can include the patch filter window 312 associated with one location on the first document image data 304 and/or the image patch matrix of the first document image data 304. Calculating the quality target scores 320 of the first plurality of image patches 308 can further include calculating a first cluster of quality target scores from the target clusters scores 324 for each image patch of the first cluster of image patches. The memory stores instructions to cause to processor to process a second aggregate image patch from the first document image data 304 and/or the first plurality of image patches 308 based on a second patch filter window, where the second aggregate image patch including a second cluster of image patches from the first plurality of image patches 308, where at least one image patch from the second cluster of image patches is identical to at least one image patch from the first cluster of image patches. The second patch filter window can include the patch filter window 312 associated with a different location than the location associated with the first patch filter window of the first document image data 304 and/or the image patch matrix of the first document image data 304. The first patch filter window and the second patch filter window can, for example, include at least one overlapping image patch from the first plurality of image patches 308. The memory stores instructions to further cause the processor to calculate a second cluster of quality target scores from the target clusters scores 324 for each image patch from the second cluster of image patches based on the at least one image patch from the first cluster of image patches and the at least one image patch from the second cluster of image patches that are identical to each other. The memory of the image quality assessment device can store instructions to cause the processor to process multiple aggregate image patches covering the entirety of the first document image data and/or the first plurality of image patches 308, to generate multiple target clusters scores 324.

In some implementations, the memory stores instructions to cause the processor to update the quality target score of one or more overlapping image patches between the first cluster of image patches and the second cluster of image patches The overlapping image patches can, for example, include neighboring image patches of one location and included in a cluster of image patches of another location based on a number of correct natural language readable data and/or based on the natural language control source 316.

In some implementations, prior to processing the first plurality of image patches 308, the memory can store instructions to cause the processor to reduce a size of each image patch from the first plurality of image patches 308, to increase a number of image patches in the patch filter window 312. The memory can also store instructions to cause the processor to adjust the size of each image patch from the first plurality of image patches 308 based on a character threshold, prior to processing the first plurality of image patches 308 to calculate the quality target score of the plurality of quality target scores. The character threshold can indicate a minimum count of readable data in each image patch of the first plurality of image patches 308, compared to the natural language control source 316.

Continuing with the training process of the quality assessment machine learning model 328, the memory of the image quality assessment device includes instructions to cause the processor to train the quality assessment machine learning model 328 based on at least one of the first plurality of image patches or the quality target scores 320, to produce a trained quality assessment machine learning model 332. The quality assessment machine learning model 328 and/or the trained quality assessment machine learning model 332, can include for example any quality assessment machine learning model as described in the entirety of this disclosure. In some implementations, the memory can store instructions to cause the processor to train the quality assessment machine learning model using a training set 352, where the training set including readable data correlated to a target score. In some implementations, the training set 352 used to train the quality assessment machine learning model 328 does not include readable data and is not correlated to labeled data such as ground truth. The labeled data can include image patches correlated with target quality scores from previous iterations of training and/or testing the quality assessment machine learning model 328.

In some implementations, the memory can store instructions to cause the processor to train the quality assessment machine learning model 328 using multiple aggregate image patch matrices (not shown) as an input. The aggregate image patch matrices can include any aggregate image patch matrices as described in the entirety of this disclosure. For instance, the aggregate image patch matrix can include a subset of image patches of the first document image data 304 outlined by the image patch matrix and the patch filter window 312. The aggregate image patch matrix can include the first plurality of image patches 308 of the first document image data 304, such as, for example, neighboring image patches. The aggregate image patch matrix can refer to a neighborhood of image patches that include both the image patches well within the outline of the patch filter window 312 as well as the neighboring image patches that are covered by the outline of the outline of the patch filter window 312, but not entirely. The neighborhood of image patches (e.g., aggregate image patches) can be used as inputs for training and/or testing the quality assessment machine learning model 328. The memory of the image quality assessment device can also store instructions to cause the processor to train the quality assessment machine learning model 328 automatically.

Once the machine learning model 328 is trained (e.g., the trained machine learning model 332), the testing process can test the trained machine learning model 332. The trained machine learning model 332 can further be trained with other document image data in multiple iterations. The memory of the image quality assessment device stores instructions to cause the processor to receive a second document image data 336. The second document image data 336 can include any second document image data as described in the entirety of this disclosure. The memory stores instructions to extract a second plurality of image patches 340. The second plurality of image patches 340 can be extracted via a patch extractor (e.g., the patch extractor of FIG. 1) and based on the image patch matrix used to extract the first plurality of image patches 308. The second plurality of image patches 340 can be extracted similar to extracting the first plurality of image patches 308. In some cases, the image patch matrix can vary for different document image data. The memory stores instructions to generate a second aggregate image patch matrix of a plurality of second aggregate image patch matrices (not shown) based on the second plurality of image patches 340.

The memory of the image quality assessment device stores instructions to further cause the processor to execute the trained quality assessment machine learning model 332 using the plurality of aggregate image patch matrices and/or the second plurality of image patches 340 as an input, to produce a quality target score of a plurality of quality target scores (not shown) for each image patch from the second plurality of image patches 340. Each image patch can be given a single score such as the quality target score. The quality target score can be calculated based on an overlap and/or union of image patches of the among the second aggregate image patch matrices. The memory can store instructions to execute the trained quality assessment machine learning model 332 automatically and/or on the fly.

The memory of the image quality assessment device stores instructions to generate a qualitative value score 344 for the second document image data 336 based on the plurality of quality target scores for the second plurality of image patches 340. The qualitative value score can include (or be) a numerical score and/or grade that determines the level of correctness in identifying the natural language readable data found in the second document image data 336. The qualitative value score can also indicate whether the second document image data is clean enough or noisy and can benefit from denoising. In some implementations, the instructions to cause the processor to generate the qualitative value score 344 for the second document image data 336 includes instructions to further cause the processor to generate the qualitative value score 344 based on the plurality of quality target scores calculated for the second plurality of image patches 340 concurrently during iterative training of the trained quality assessment machine learning model 332 using the future document image data. The memory can store instructions to generate the qualitative value score 344 automatically.

In some implementations, the memory can store instructions to cause the processor to generate a labeled control source 348 including natural language readable data of the second plurality of image patches 340 based on the qualitative value score 344. The labeled control source 348 can be used to generate the training set 352 to train the machine learning model 328 and/or the trained machine learning model 332 in a supervised state. For instance, the trained quality assessment machine learning model 332 can include (or be) a first trained quality assessment machine learning model where the memory stores instructions to further cause the processor to train the first trained quality assessment model based on the plurality of quality target scores of the second document image data having a qualitative value score above a noise score threshold, to produce a second trained quality assessment machine learning model. The noise score threshold can include a minimum and/or maximum value and/or number for the qualitative value score for the second document image data 336 that indicates if the second document image data 336 is clean or noisy/corrupted enough to benefit from denoising. Denoising of the second document image data 336 can include removing, to at least an extent, the noise found in the second document image data 336.

FIG. 4A is a diagrammatic representation of a document image 400 with large image patches and a patch filter window 404, according to an embodiment. The document image 400 as shown in FIG. 4A is outlined by an image patch matrix 402 that equally divides the document image 400 into image patches. The image patch matrix 402, and any image patch matrix as described in the entirety of this disclosure, can cover the entirety of the document image 400 and additional spaces outside the edges of the document image 400 to fit inside the dimension of the image patch matrix 402. The document image 400 shown in FIG. 4A includes 30 image patches, where only one full image patch, (e.g., image patch 408) can be seen within the borders of the patch filter window 404. The size of the image patches can be determined by an image patch matrix. In some cases, all the complete image patches inside the patch filter window 404 can be consistent with a cluster of image patches as described herein. The patch filter window 404 also covers some portions of neighboring image patches 412 as shown in FIG. 4A. The neighboring image patches 412 and the image patch 408 can be for example consistent with an aggregate image patch matrix 402 as described herein. The aggregate image patch matrix 402, also called a neighborhood of image patches, can be used as an input to train a quality assessment machine learning model of the image quality assessment device (e.g., image quality assessment device 101 of FIG. 1).

FIG. 4B is a diagrammatic representation of a document image 400 with small image patches and the patch filter window 404, according to an embodiment. The document image 400 as shown in FIG. 4B is outlined by an image patch matrix 403 that equally divides the document image 400 into image patches, where the image patch matrix 403 of FIG. 4B is different from the image patch matrix 402 of FIG. 4A. The image patches of FIG. 4B are smaller than the image patches of FIG. 4A based on the image patch matrix 403 of FIG. 4B having the same size as the size of the image patch matrix 402 of FIG. 4A, thus reducing the size of the image patches in the image patch matrix 403 of FIG. 4B compared to the size of the image patches in the image patch matrix 402 of FIG. 4A.

The cluster of image patches inside the patch filter window 404 of FIG. 4B include a total of 25 complete image patches (e.g., image patches 412). The patch filter window 404 can also partially cover multiple neighboring image patches 416, forming an aggregate image patch matrix 410 to be used as an input for the quality assessment machine learning model of the image quality assessment device (e.g., image quality assessment device 101 of FIG. 1). Based on the size and/or features of the document image 400, the image quality assessment device can augment the size of the image patches.

It is to be noted that any one or more of the aspects and embodiments described herein can be conveniently implemented using one or more machines (e.g., one or more compute devices that are utilized as a user compute device for an electronic document, one or more server devices, such as a document server, etc.) programmed according to the teachings of the present specification. Appropriate software coding can readily be prepared by skilled programmers based on the teachings of the present disclosure. Aspects and implementations discussed above employing software and/or software modules can also include appropriate hardware for assisting in the implementation of the machine executable instructions of the software and/or software module.

Such software can be a computer program product that employs a machine-readable storage medium. A machine-readable storage medium can be any medium that is capable of storing and/or encoding a sequence of instructions for execution by a machine (e.g., a compute device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software can also include information (e.g., data) carried as a data signal on a data carrier, such as a carrier wave. For example, machine-executable information can be included as a data-carrying signal embodied in a data carrier in which the signal encodes a sequence of instruction, or portion thereof, for execution by a machine (e.g., a compute device) and any related information (e.g., data structures and data) that causes the machine to perform any one of the methodologies and/or embodiments described herein.

Examples of a compute device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a compute device can include and/or be included in a kiosk.

All combinations of the foregoing concepts and additional concepts discussed herewithin (provided such concepts are not mutually inconsistent) are contemplated as being part of the subject matter disclosed herein. The terminology explicitly employed herein that also can appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments can be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments cannot have been presented for a specific portion of the innovations or that further undescribed alternate embodiments can be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments can be utilized and functional, logical, operational, organizational, structural and/or topological modifications can be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For example, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general-purpose processor, a central processing unit (CPU), a microprocessor, a digital signal processor (DSP), a controller, a microcontroller, a state machine and so forth. Under some circumstances, a "processor" can refer to an application specific integrated circuit (ASIC), a programmable logic device (PLD), a field programmable gate array (FPGA), etc. The term "processor" can refer to a combination of processing devices, e.g., a combination of a DSP and a microprocessor, multiple microprocessors, one or more microprocessors in conjunction with a DSP core or any other such configuration.

The term "memory" should be interpreted broadly to encompass any electronic component capable of storing electronic information. The term memory can refer to various types of processor-readable media such as random-access memory (RAM), read-only memory (ROM), non-volatile random-access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" can refer to one or more programs, routines, subroutines, functions, procedures, etc. "Instructions" and "code" can comprise a single computer-readable statement or many computer-readable statements.

The term "modules" can be, for example, distinct but interrelated units from which a program may be built up or into which a complex activity may be analyzed. A module can also be an extension to a main program dedicated to a specific function. A module can also be code that is added in as a whole or is designed for easy reusability.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts can be embodied as one or more methods, of which at least one example has been provided. The acts performed as part of the method can be ordered in any suitable way. Accordingly, embodiments can be constructed in which acts are performed in an order different than illustrated, which can include performing some acts simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

In addition, the disclosure can include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein can be implemented in a manner that enables a great deal of flexibility and customization as described herein.

All definitions, as defined and used herein, should be understood to control over dictionary definitions, definitions in documents incorporated by reference, and/or ordinary meanings of the defined terms.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus, comprising:
a processor; and
a memory operatively coupled to the processor, the memory storing instructions to cause the processor to:
receive document image data and a natural language control source that includes unlabeled data;
extract a plurality of image patches of an image patch matrix of a document image formed by the document image data;
process the plurality of image patches based on a patch filter window, to calculate a quality target score of a plurality of quality target scores for each image patch of a plurality of image patches based on the natural language control source; and
train a quality assessment machine learning model based on at least one of the plurality of image patches or the plurality of quality target scores, to produce a trained quality assessment machine learning model.

2. The apparatus of claim 1, wherein the quality assessment machine learning model includes an end-to-end machine learning model.

3. The apparatus of claim 1, wherein the quality assessment machine learning model is included in a three-dimensional convolutional neural network.

4. The apparatus of claim 1, wherein the instructions to cause the processor to process the plurality of image patches to calculate the quality target score include instructions to further cause the processor to calculate the quality target score of the plurality of quality target scores for each image patch of the plurality of image patches based on a number of correct natural language readable data and the natural language control source.

5. The apparatus of claim 1, wherein the instructions to cause the processor to train the quality assessment machine learning model includes instructions to further cause the processor to train the quality assessment machine learning model using a training set, the training set including readable data correlated to a target score.

6. The apparatus of claim 5, wherein the instructions to cause the processor to train the quality assessment machine learning model includes instructions to further cause the processor to train the quality assessment machine learning model without labeling the training set.

7. The apparatus of claim 1, wherein the memory stores instructions to further cause the processor to reduce a size of each image patch from the plurality of image patches, to increase a number of image patches in the patch filter window, prior to processing the plurality of image patches to calculate the quality target score of the plurality of quality target scores.

8. The apparatus of claim 1, wherein the memory stores instructions to further cause the processor to adjust a size of each image patch from the plurality of image patches based on a character threshold, prior to processing the plurality of image patches to calculate the quality target score of the plurality of quality target scores, the character threshold indicating a minimum count of readable data in each image patch of the plurality of image patches.

9. The apparatus of claim 1, wherein the memory stores instructions to further cause the processor to:
process a first aggregate image patch from the document image data based on a first patch filter window, the first aggregate image patch including a first cluster of image patches;
calculate a first cluster of quality target scores for each image patch of the first cluster of image patches;
process a second aggregate image patch from the document image data based on a second patch filter window, the second aggregate image patch including a second cluster of image patches, at least one image patch from the second cluster of image patches being identical to at least one image patch from the first cluster of image patches; and
calculate a second cluster of quality target scores for each image patch from the second cluster of image patches based on the at least one image patch from the first cluster of image patches and the at least one image patch from the second cluster of image patches that are identical to each other.

10. The apparatus of claim 7, wherein the memory stores instructions to cause the processor to update the quality target score of one or more overlapping image patches between the first cluster of image patches and the second cluster of image patches.

11. The apparatus of claim 1, wherein the instructions to cause the processor to train the quality assessment machine learning model includes instructions to further cause the processor to train the quality assessment machine learning model automatically.

12. An apparatus, comprising:
a processor; and
a memory operatively coupled to the processor, the memory storing instructions to cause the processor to:
receive document image data;
extract a plurality of image patches of an image patch matrix of a document image formed by the document image data, to generate an aggregate image patch matrix of a plurality of aggregate image patch matrices;
execute a trained quality assessment machine learning model using the plurality of aggregate image patch matrices as an input, to produce a quality target score of a plurality of quality target scores for each image patch from the plurality of image patches;
generate a qualitative value score for the document image data based on the plurality of quality target scores; and
generate a labeled control source including natural language readable data of the plurality of image patches based on the qualitative value score.

13. The apparatus of claim 12, wherein the memory stores instructions to further cause the processor to iteratively train the trained qualitative assessment machine learning model using future document image data.

14. The apparatus of claim 13, wherein the instructions to cause the processor to generate the qualitative value score for the document image data includes instructions to further cause the processor to generate the qualitative value score based on the plurality of quality target scores concurrently during iterative training of the trained quality assessment machine learning model using the future document image data.

15. The apparatus of claim 12, wherein the memory stores instructions to further cause the processor to:
automatically execute the trained quality assessment machine learning model using the plurality of image patches as an input, to produce a plurality of quality target scores for each image patch of the plurality of image patches,
the instructions to generate the qualitative value score includes instructions to automatically generate the qualitative value score for the document image data.

16. The apparatus of claim 12, wherein:
the trained quality assessment machine learning model is a first trained quality assessment machine learning model; and
the memory stores instructions to further cause the processor to train the first trained quality assessment model based on the plurality of quality target scores of the document image data having a qualitative value score above a noise score threshold, to produce a second trained quality assessment machine learning model.

17. The apparatus of claim 12, wherein the wherein the memory stores instructions to further cause the processor to:
the trained quality assessment machine learning model is a first trained quality assessment machine learning model; and
the memory stores instructions to further cause the processor to train the first trained quality assessment model based on the plurality of quality target scores of the document image data having a qualitative value score below the noise score threshold, to produce a second trained quality assessment machine learning model.

18. A method, comprising:
receiving first document image data and a natural language control source;
extracting a first plurality of image patches of an image patch matrix of a first document image formed by the first document image data;
processing the first plurality of image patches based on a patch filter window, to calculate a quality target score from a plurality of quality target scores for each image patch of the first plurality of image patches based on the natural language control source;
training a quality assessment machine learning model based on at least one of the plurality of image patches or the plurality of quality target scores, to produce a trained quality assessment machine learning model;
receiving second document image data;

extracting a second plurality of image patches of an image patch matrix of a second document image formed by the second document image data, to generate an aggregate image patch matrix from a plurality of aggregate image patch matrices;

executing the trained quality assessment machine learning model using the plurality of aggregate image patch matrices as an input, to produce a quality target score from a plurality of quality target scores for each image patch from the second plurality of image patches; and generating a qualitative value score for the second document image data based on the plurality of quality target scores.

19. The method of claim 18, wherein each of receiving the first document image, processing, training, receiving the second document image, extracting, executing and generating is performed automatically.

20. The method of claim 18, wherein processing the first plurality of image patches based on a patch filter window includes:

processing a first aggregate image patch of the first document image data based on a first patch filter window, the first aggregate image patch including a first cluster of image patches;

calculating a first cluster of quality target scores for each image patch of the first cluster of image patches;

processing a second aggregate image patch of the first document image data based on a second patch filter window, the second aggregate image patch including a second cluster of image patches, at least one image patch from the second cluster of image patches being identical to at least one image patch from the first cluster of image patches; and calculating a second cluster of quality target scores for each image patch from the second cluster of image patches based on the at least one image patch from the first cluster of image patches and the at least one image patch from the second cluster of image patches that are identical to each other.

21. The method of claim 20, wherein the calculating the second cluster of quality target scores for each image patch from the second cluster of image patches includes updating the quality target score of one or more overlapping image patches between the first cluster of image patches and the second cluster of image patches.

* * * * *

UNITED STATES PATENT AND TRADEMARK OFFICE
CERTIFICATE OF CORRECTION

PATENT NO.         : 11,763,581 B1
APPLICATION NO.    : 17/967311
DATED              : September 19, 2023
INVENTOR(S)        : Mehrdad Jabbarzadeh Gangeh et al.

Page 1 of 1

It is certified that error appears in the above-identified patent and that said Letters Patent is hereby corrected as shown below:

In the Specification

In Column 23, Line 9: replace "ations-in-part, divisional s, and/or the like thereof. As such," with --ations-in-part, divisionals, and/or the like thereof. As such,--

Signed and Sealed this
Twenty-first Day of November, 2023

Katherine Kelly Vidal
*Director of the United States Patent and Trademark Office*